(12) United States Patent
Prochaska

(10) Patent No.: US 10,074,974 B2
(45) Date of Patent: Sep. 11, 2018

(54) ELECTRICAL FACILITY AND ARRANGEMENT FOR PROTECTING THE ELECTRICAL FACILITY

(71) Applicant: Siemens Aktiengesellschaft, Munich (DE)

(72) Inventor: Dirk Prochaska, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 389 days.

(21) Appl. No.: 14/954,327

(22) Filed: Nov. 30, 2015

(65) Prior Publication Data

US 2016/0164280 A1     Jun. 9, 2016

(30) Foreign Application Priority Data

Dec. 3, 2014   (EP) .................................... 14196062

(51) Int. Cl.
*H02H 9/04* (2006.01)
*H02H 3/20* (2006.01)

(52) U.S. Cl.
CPC ............ *H02H 9/045* (2013.01); *H02H 3/202* (2013.01); *H02H 9/041* (2013.01)

(58) Field of Classification Search
CPC ......... H02H 9/045; H02H 3/202; H02H 9/041
See application file for complete search history.

(56) References Cited

U.S. PATENT DOCUMENTS

| 3,662,250 | A | * | 5/1972 | Piccone | ................. H01L 29/00 257/170 |
| 5,483,142 | A | * | 1/1996 | Skibinski | ............... H02H 9/001 320/166 |
| 9,654,016 | B2 | * | 5/2017 | Sander | ............. H02M 3/33546 |
| 2009/0174330 | A1 | | 7/2009 | Saveliev et al. | |

FOREIGN PATENT DOCUMENTS

| CN | 201893551 | | 7/2011 | |
| CN | 203086133 | | 7/2013 | |
| DE | 102005006100 | A1 | 8/2006 | |
| JP | 409205776 | A * | 1/1996 | ............... H02H 9/04 |
| JP | 2010057332 | A | 3/2010 | |
| WO | WO9617419 | A1 | 6/1996 | |

OTHER PUBLICATIONS

Office Action dated Oct. 23, 2017 which issued in the corresponding Chinese Patent Application No. 201510873077.4.

* cited by examiner

*Primary Examiner* — Zeev V Kitov
(74) *Attorney, Agent, or Firm* — Cozen O'Connor

(57) ABSTRACT

An arrangement for protecting an electrical facility from overvoltages having an overcurrent protection facility arranged in a first series circuit and a shunt circuit arranged between the overcurrent protection facility and the electrical facility to be protected, the shunt series resulting in a second series circuit, wherein a diode for discharging transient overvoltages is arranged in the shunt circuit, which is conductive if a voltage threshold is exceeded, as a result of which the current resulting from the overvoltage can be (Continued)

passed through the shunt circuit to the facility to be protected into the second shunt circuit, where a first inductor is arranged in a series connection to the diode, the diode is connected here to a first diode terminal on the first series circuit and is connected to a second diode terminal on the first inductor, and where the overcurrent protection facility is not triggered prematurely by temporary overvoltages.

5 Claims, 1 Drawing Sheet

ELECTRICAL FACILITY AND ARRANGEMENT FOR PROTECTING THE ELECTRICAL FACILITY

BACKGROUND OF THE INVENTION

1. Field of the Invention

The invention relates to an arrangement for protecting an electrical facility from overvoltages with an overcurrent protection facility arranged in a first series circuit and a shunt circuit arranged between the overcurrent protection facility and the electrical facility to be protected, where the shunt circuit leads to a second series circuit, where a diode for discharging transient overvoltages is arranged in the shunt circuit, and where the diode is designed to be conductive, if a voltage threshold is exceeded, as a result of which the current resulting from the overvoltage can be passed through the shunt circuit to the facility to be protected into the second series circuit.

2. Description of the Related Art

It is common knowledge that with voltage supplies to electrical devices, it is conventional to arrange a suppressor diode downstream of a device fuse to limit overvoltages. The disadvantage with this known arrangement, however, is that brief voltage pulses may cause the device fuse to prematurely trigger. The device fuse is as a rule designed to only trigger in the event of static overvoltages or overcurrents. It is not desirable, however, for the device fuse to already trigger on account of premature voltage pulses.

One known solution is to circumvent the problem of designing the device fuse such that an increase in its responding behavior is achieved, which may result in problems in the case of a real fault, because the device to be secured is possibly still briefly supplied with an overcurrent.

SUMMARY OF THE INVENTION

In view of the foregoing, it is an object of the invention to provide an improved arrangement for protecting an electrical facility from overvoltages such that the electrical facility is still comprehensively protected, but a fuse or an overcurrent protection facility for the electrical device does not prematurely trigger.

This and other objects and advantages are achieved in accordance with the invention by an arrangement in which a first inductor is arranged in a series connection to the diode. Here, the diode is connected to a first diode terminal on a first series circuit and to a second diode terminal on the first inductor. As a result, the overcurrent protection facility does not prematurely trigger in the event of temporary overvoltages.

With short overvoltage pulses, such as with a brief overvoltage as a result of EMC effects or as a result of a lightning strike in a higher-level zone, which is however electrically connected to the facility to be protected by way of detours, the overcurrent protection facility may be triggered as a result of the response of the diode, particularly when the diode is designed as a suppressor diode. An inductor is introduced into the branch of the diode in order to avoid the premature triggering of the overcurrent protection facility. The inductor represents a high reactance for high frequency parts of the overvoltage pulse, where the reactance limits the current.

In a further optimized embodiment of the arrangement, a second inductor in the first series circuit is connected between the shunt circuit and the electrical facility to be protected and additionally a capacitance, which connects the first and the second series branch, is connected between the second inductor and the electrical facility to be protected. The second inductor now prevents, in the event of an overvoltage pulse, an excessively fast increase in the current in the first series circuit. At the same time, a reduction in the voltage on the capacitance, in particular on a capacitor, is achieved. The capacitance usually comprises a charging capacitor and is disposed downstream of the second inductor, which indicates that during the overvoltage pulse the main part of the overvoltage drops at the second inductor and the electrical device to be protected, which is usually connected in parallel to the capacitance, is thus protected.

In a further improved embodiment of the arrangement, the first inductor is connected to the second inductor such that the two inductors interact magnetically with one another, where their sense of winding is arranged in the same direction. As a result, a first start of winding of the first inductor is connected to the second diode terminal of the diode and a second start of winding of the second inductor is connected to the first diode terminal of the diode.

If the first inductor and the second inductor comprise, for instance, a transducer or a transformer with as fixed a coupling as possible, the afore-cited effect intensifies on account of the mutual inductor influence. In the event of an overvoltage pulse, almost the entire voltage drops across the second inductor. This voltage is transmitted in a transformer-coupled manner into the first inductor and raises the voltage potential of the diode by almost the same amount. As a consequence, significantly less overcurrent flows through the diode, in particular through the suppressor diode. This reduced overcurrent current in turn generates a flow in the first inductor that leads to an induction of a voltage in the second inductor. The level at an output of the arrangement is reduced by this induced voltage. The arrangement accordingly reduces the voltage at its output and reduces the current flow through the suppressor diode in the event of interference pulses. If the induced voltages are observed on both sides of the cited transducer, these induced voltages always counteract the current flow and thus reduce current through the overcurrent protection facility and the suppressor diode and the current through the entire circuit. With a static overvoltage, the first inductor acts as a DC resistor, where the voltage level through the suppressor diode is limited and the overcurrent protection facility is intentionally triggered if the suppressor diode is triggered.

A synergistic effect is produced in that a huge variety of first inductors and second inductors is already offered in their connected embodiment in the form of, for example, current-compensated throttles. These current-compensated throttles are now however connected in a completely different manner in accordance with the invention than was otherwise conventional with current-compensated throttles. This new type of connection results in a sudden improvement in the pulse robustness of an arrangement for protecting an electrical facility from overvoltages. As a result, the facilities or electrical devices to be protected experience a significant quality improvement and increased robustness in terms of their use in EMC-compromised environments.

Particularly with respect to industrial automation technology with increased requirements in terms of robustness of electrical facilities, it is advantageous if an electrical facility is provided with a first terminal and a second terminal for connecting a supply voltage, wherein an arrangement in accordance with the disclosed embodiments is connected to the first terminal and the second terminal such that the capacitance is arranged between the first terminal, and the second terminal and the supply voltage is fed to the facility via the arrangement.

If the electrical facility also comprises an automation component for use in industrial automation, the automation components used can thus advantageously be used with increased robustness, particularly in an EMC-loaded industrial environment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment, in which.

DETAILED DESCRIPTION OF THE EXEMPLARY EMBODIMENTS

Figure 1:
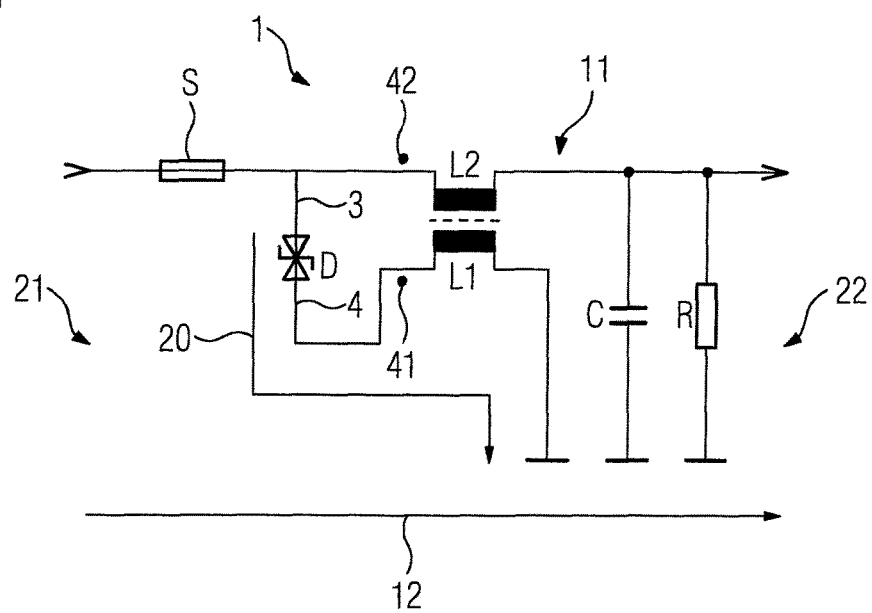
FIG. 1 shows an arrangement for protecting an electrical facility in accordance with the invention.

With reference to FIG. 1, an arrangement 1 for protecting an electrical facility 2 from overvoltages is shown. The arrangement 1 has an input 21 for connecting a supply voltage and an output 22 for connecting the electrical facility 2. A first series circuit 11 and a second series circuit 12 run between the input 21 and the output 22. The second series circuit 12 essentially serves as the ground connection for the arrangement 1.

Based on the input 21, an overcurrent protection facility S, for instance a fuse or an automatic circuit breaker is firstly disposed in the direction of the output 22 in the first series circuit 11, a diode D for discharging transient overvoltages is connected downstream of the overcurrent protection facility S to a first diode terminal 3 on the first series circuit 11. Moreover, a second inductor L2 is present in the first series circuit 11 in series with the overcurrent protection facility S. The first series circuit 11 leads from the second inductor L2 further to the output 22, whereupon the electrical facility 2 can finally be connected.

In order to protect the electrical facility 2 from overvoltages, a shunt circuit 20 is arranged between the overcurrent protection facility S and the electrical facility 2 to be protected. The diode D for discharging transient overvoltages is arranged in the shunt series 20. The diode D is designed to be conductive if a voltage threshold is exceeded at the input 21. As a result, the current resulting from the overvoltage can be passed through the shunt circuit 20 to the facility 2 to be protected into the second series circuit 12. Here, a first inductor L1 is arranged in a series circuit with the diode D, where the diode D with its first diode terminal 3 is connected to the first series circuit 11 and with a second diode terminal 4 to the first inductor L1.

The first inductor L1 is coupled to the second inductor L2 such that the two inductors L1, L2 interact magnetically with one another, where their sense of winding is arranged in the same direction. In this way, a first start of winding 41 of the first inductor L1 is connected to the second diode terminal 4 of the diode D and a second start of winding 42 of the second inductor L2 is connected to the first diode terminal 3 of the diode D. A capacitance C is also arranged between the second inductor L2 and the electrical facility 2 to be protected, where the capacitance C connects the first and second series circuit 11, 12 and at the same time represents the output 22.

It is advantageously possible to use the first and second inductor L1, L2 as a component, in particular as a current-compensated throttle. A synergistic effect is produced as a result, because the component comprising the first inductor L1 and the second inductor L2 is already offered in a large variety in the form of the current-compensated throttle. It is however connected in accordance with the invention completely differently, which results in a sudden improvement in the pulse robustness for instance of input circuits, filter, protective circuits, for electrical devices, and thus achieves a significant quality improvement and increased robustness or the availability of the device increases significantly.

One special technical effect lies in the use of the connected inductors L1 and L2 or the mutual inductor resulting therefrom. Both inductors L1, L2 act like a transformer. The voltages induced in both inductors L1, L2 each act in a relieving manner for the overcurrent protection facility S. Essential to the release is the special interaction into the inductors L1 and L2 acting as transformers, which results in that in the event of a short voltage pulse at the input 21 of the arrangement 1 in conjunction with the capacitance C at the output 22, almost the entire pulse voltage is applied to the second inductor L2 and directly reduces the voltage at the output 22 by the amount of voltage drop at the second inductor and thus protects the electrical facility 2.

Moreover, there is a further surprising effect, which consists in the pulse voltage applied across the second inductor L2, as a result of the embodiment of the inductors L1, L2, being transferred as a transformer into the inductor L1 and forming a counter voltage, this counter voltage produces the avalanche voltage of the diode D, particularly with the use of a suppressor diode, and the current flow through the diode D can thus be briefly reduced or not further increased. In turn, the residual current through the first inductor L1 at the same results in an induction in the second inductor L2 (counter voltage), as a result of which the afore-described effect of the release of the voltage amplifies across the capacitance C. The long-held requirement is thus fulfilled in that the overcurrent protection facility S does not prematurely trigger on account of a short voltage pulse. Static overvoltages are performed by the described scenario, because the inductors L1, L2 only act with their ohmic part and a transformer effect does not materialize.

Figure 2:
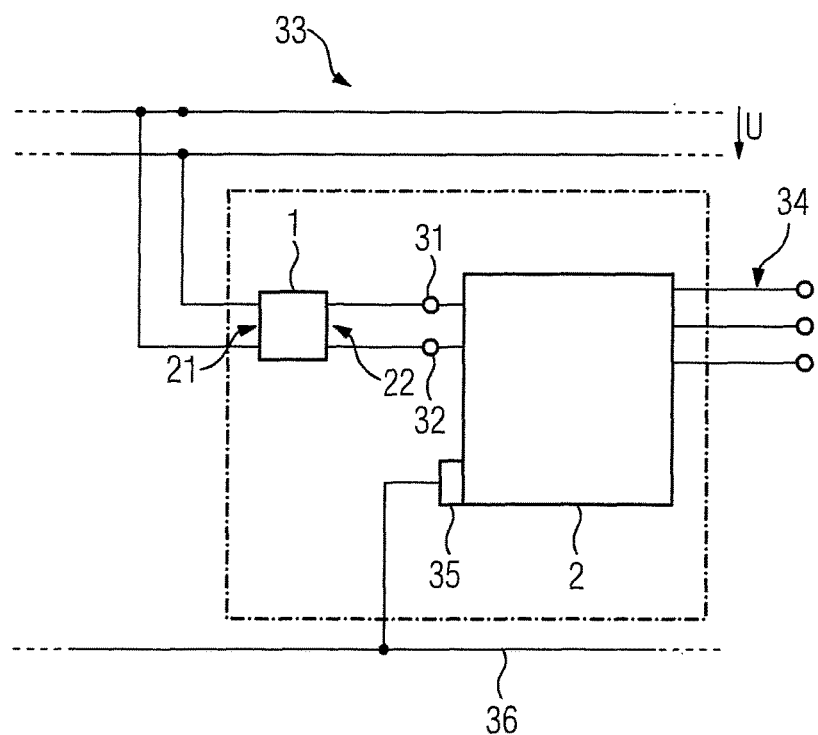
FIG. 2 shows an electrical facility comprising an automation component in an industrial environment.

The advantageous use of the arrangement 1 in the operation of an industrial field is shown in FIG. 2. The electrical facility 2 comprises an automation component for use in industrial automation. The electrical facility 2 comprises a first terminal 31 and a second terminal 32 for connecting a supply voltage U, where the arrangement known from FIG. 1 is connected to the first terminal 31 and the second terminal 32 such that the capacitance C is arranged between the first terminal 31 and the second terminal 32 and the supply voltage U is guided via the arrangement 1 to the facility 2. The arrangement 1 is connected with its input 21 to a supply voltage network 33. Moreover, the automation components comprise outputs 34 for controlling an industrial process. The automation component of higher-level automation devices can receive control commands via a field bus 36, where the automation component is connected with a field bus terminal 35 to the field bus 36.

With brief voltage pulses, such as with a brief overvoltage as a result of a lightning strike in a higher-level zone, which is then in turn coupled in any electrical manner to the supply voltage network 33, this results in the overcurrent protection facility S being triggered as a result of the immediate reaction of the diode D without the use of the inventive arrangement 1. Relief is now produced by the first inductor L1 having been introduced into the shunt circuit 20 of the diode D. The first inductor L1 represents a high reactance for the high frequency components of an overvoltage pulse, which limits the current through the diode D. At the same time, the second inductor L2 prevents an excessively fast increase in the current in the first series circuit 11. By preventing the excessively fast increase, the voltage at the output 22 or at the first terminal 31 and the second terminal 32 is also reduced. The capacitance C, comprising as a charging capacitor, is disposed downstream of the second inductor L2, which indicates that almost the entire overvoltage of the inductor L2 or with the use of a current-compensated throttle, drops at the throttle during the overvoltage pulse and the output 22 is thus protected.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement for protecting an electrical facility from overvoltages, comprising:
    an overcurrent protection facility arranged in a first series circuit;
    a second series circuit;
    a shunt circuit arranged between the overcurrent protection facility and the electrical facility to be protected, said shunt circuit leading to the second series circuit,
    a diode for discharging transient overvoltages arranged in the shunt circuit, said diode being conductive, if a voltage threshold is exceeded such that current resulting from the overvoltage is passed through the shunt circuit to the facility to be protected into the second series circuit;
    a first inductor arranged in a series connection with the diode, wherein the diode being connected to the first series circuit at a first diode terminal and being connected to the first inductor at a second diode terminal, whereby with temporary overvoltages the overcurrent protection facility is not triggered prematurely;
    a second inductor connected in the first series circuit between the shunt circuit and the electrical facility to be protected; and
    a capacitance connecting the first and second series circuit between the second inductor and the electrical facility to be protected;
    wherein the first inductor is coupled to the second inductor such that the two inductors interact magnetically with one another, wherein the first and second inductors have windings arranged in the same direction, such that a first start of winding of the first inductor is connected to the second diode terminal of the diode and a second start of winding of the second inductor is connected to the first diode terminal of the diode.

2. The arrangement as claimed in claim 1, wherein the first and the second inductors are formed as a component.

3. An electrical facility having a first terminal and a second terminal for connecting a supply voltage, wherein the arrangement as claimed in claim 1 is connected to the first terminal and the second terminal such that a capacitance is arranged between the first terminal and the second terminal and the supply voltage is guided via the arrangement to the facility.

4. The electrical facility as claimed in claim 3, wherein electrical facility comprises an automation component which is implemented in industrial automation.

5. The arrangement as claimed in claim 2, wherein the component comprises a current-compensated throttle.

* * * * *